(12) United States Patent
Li et al.

(10) Patent No.: US 9,665,759 B2
(45) Date of Patent: May 30, 2017

(54) DECODING METHOD FOR MATRIX TWO-DIMENSIONAL CODE

(71) Applicant: SHENZHEN MPR TECHNOLOGY CO., LTD, Shenzhen, Guangdong (CN)

(72) Inventors: Zhengfang Li, Guangdong (CN); Zhiguo Chang, Guangdong (CN); Yingfeng LV, Guangdong (CN)

(73) Assignee: SHENZHEN MPR TECHNOLOGY CO., LTD, Shenzhen (CN)

( * ) Notice: Subject to any disclaimer, the term of this patent is extended or adjusted under 35 U.S.C. 154(b) by 6 days.

(21) Appl. No.: 14/400,460

(22) PCT Filed: May 10, 2013

(86) PCT No.: PCT/CN2013/075517
§ 371 (c)(1),
(2) Date: Nov. 11, 2014

(87) PCT Pub. No.: WO2013/166995
PCT Pub. Date: Nov. 14, 2013

(65) Prior Publication Data
US 2015/0129658 A1 May 14, 2015

(30) Foreign Application Priority Data
May 11, 2012 (CN) .......................... 2012 1 0145746

(51) Int. Cl.
*G06K 7/10* (2006.01)
*G06K 7/14* (2006.01)

(52) U.S. Cl.
CPC ......... *G06K 7/1417* (2013.01); *G06K 7/1443* (2013.01); *G06K 7/1456* (2013.01)

(58) Field of Classification Search
CPC ...... G06K 7/14; G06K 7/1404; G06K 7/1408; G06K 7/1439; G06K 7/1443; G06K 7/1447; G06K 7/1456
See application file for complete search history.

(56) References Cited

U.S. PATENT DOCUMENTS 6,604,682 B2 * 8/2003 Wakamiya ........... G06K 7/1456
235/462.01
7,600,693 B2 * 10/2009 Pettersson ........... G06F 3/03545
235/454

(Continued)

FOREIGN PATENT DOCUMENTS

CN 1452117 10/2003
CN 1670763 9/2005

(Continued)

OTHER PUBLICATIONS

Chinese Search Report issued for Chinese Patent Application No. 2012101457462 filed May 11, 2012, 1 page.

(Continued)

*Primary Examiner* — Thien M Le
*Assistant Examiner* — April Taylor
(74) *Attorney, Agent, or Firm* — Hamre, Schumann, Mueller & Larson, P.C.

(57) ABSTRACT

The application provides a decoding method for a matrix two-dimensional code, wherein a matrix two-dimensional code image to be decoded is a code array of jointed matrix two-dimensional code symbols, formed by multiple identical unit code patterns; an image obtained by scanning does not need to include a complete unit code pattern, and a decoding process of the image is: obtaining a binary image of a to-be-decoded code array of jointed matrix two-dimensional code symbols, locating each data point in a unit code pattern that the data point belongs to, so as to restore a complete unit code pattern, and then performing decoding.

(Continued)

The application only needs an area twice the area of a unit code pattern even if decoding is performed when the code pattern is rotated by a most severe degree. In addition, the application can save resources.

11 Claims, 9 Drawing Sheets

(56) References Cited

U.S. PATENT DOCUMENTS

| | | | |
|---|---|---|---|
| 7,997,502 B2 * | 8/2011 | Lv | G06K 19/06037 235/494 |
| 2006/0163357 A1 | 7/2006 | Kim et al. | |
| 2007/0272755 A1 * | 11/2007 | Chang | G06K 7/14 235/462.11 |
| 2009/0184171 A1 | 7/2009 | Lv et al. | |

FOREIGN PATENT DOCUMENTS

| | | |
|---|---|---|
| CN | 100511271 | 5/2007 |
| CN | 1963843 | 6/2007 |
| CN | 101587556 | 11/2009 |
| CN | 101710385 | 5/2010 |
| CN | 101882210 | 11/2010 |
| CN | 101978380 | 2/2011 |
| CN | 102708349 | 10/2012 |
| EP | 1936535 | 6/2008 |
| JP | 2003511763 | 3/2003 |
| JP | 2005164655 | 6/2005 |
| JP | 2010510561 | 4/2010 |
| KR | 10-2009-0096461 | 6/2009 |
| WO | 01/26034 | 4/2001 |
| WO | 2008058480 | 5/2008 |

OTHER PUBLICATIONS

European Search Report issued for European Patent Application No. 13787658.7 mailed Dec. 17, 2015, 7 pages.
Japanese Notice of Reason for Rejection issued for Japanese Patent Application No. 2015-510632 dated Nov. 4, 2015, 2 pages.
Korean Grounds for Rejection issued for Korean Patent Application No. 10-2014-7034638 mailed Nov. 27, 2015, 5 pages.

* cited by examiner

DECODING METHOD FOR MATRIX TWO-DIMENSIONAL CODE

BACKGROUND

Technical Field

The present application relates to two-dimensional codes, and in particular, to a decoding method for a matrix two-dimensional code.

Related Art

People read traditional books, newspapers, and so on mainly with eyes. Such an information acquisition manner is relatively boring, and reading for a long time causes eyestrain easily. Moreover, people who are blind or have eye disease cannot read such traditional publications. Therefore, voice reading publications appear in recent years. For example, in the China invention patent of Patent Application No. ZL200610156879.4, for a multimedia print reader (MPR) publication, content in a voice reading publication can be decoded by using a two-dimensional code voice reading apparatus, so that a reader can listen to video content while reading the publication, thereby improving the reading or memorizing efficiency, and making it easier for children or people having eye or ear disease to learn. For MPR two-dimensional codes, refer to the MPR publication industry standard, including part 1 (Symbology Specifications for MPR Code, Standard No. CY/T 58.1-2009), part 2 (Encoding Rules for MPR Code, Standard No.: CY/T 58.2-2009), part 3 (General Production Specifications, Standard No.: CY/T 58.3-2009), part 4 (Printing Quality Requirement and Test Method for MPR Code, Standard No.: CY/T 58.4-2009) and part 5 (Basic Management Specifications, Standard No.: CY/T 58.5-2009) for MPR publications.

A code pattern array is printed in the voice reading publication in the foregoing China invention patent. Code pattern symbols in the code pattern array are rectangular, bar code cells in the code pattern symbol are solid points arranged at equal intervals, and cells located at four corners of the code pattern symbol are positioning points to define and recognize the border. The rest cells are data points, and the area of the positioning point is larger than the area of the data point. The code pattern symbol is arranged repeatedly on a basement and seamlessly jointed as a code pattern array. The code pattern array at least includes two same code pattern symbols, and adjacent code pattern symbols share a same positioning point; the data point cells are all included in a rectangular frame formed by connecting the centers of the adjacent positioning point cells. A decoding method thereof includes: first selecting positioning points; then performing rectangle matching on positioning point cells; after a single code pattern symbol is selected, performing data point grouping to reconstruct a data point matrix. Specifically, the decoding method includes the following steps:

1) reading a code pattern by using a reading device to obtain a gray code pattern image; 2) performing binary processing on the gray code pattern image to obtain a binary image; 3) performing data analysis on the binary image and detecting the margin of each point to obtain a margin image; 4) performing data analysis on the margin image to track closed borders in the margin image and discard all non-closed borders in the margin image to obtain a closed border image; 5) performing data analysis on the closed border image, and calculating an area within every closed border to select positioning point cells; 6) performing rectangle matching on the positioning point cells to select one single image of the code pattern symbol; 7) grouping data points in the image of the code pattern symbol; 8) reconstructing a data point matrix; and 9) restoring code words.

Figure 1:
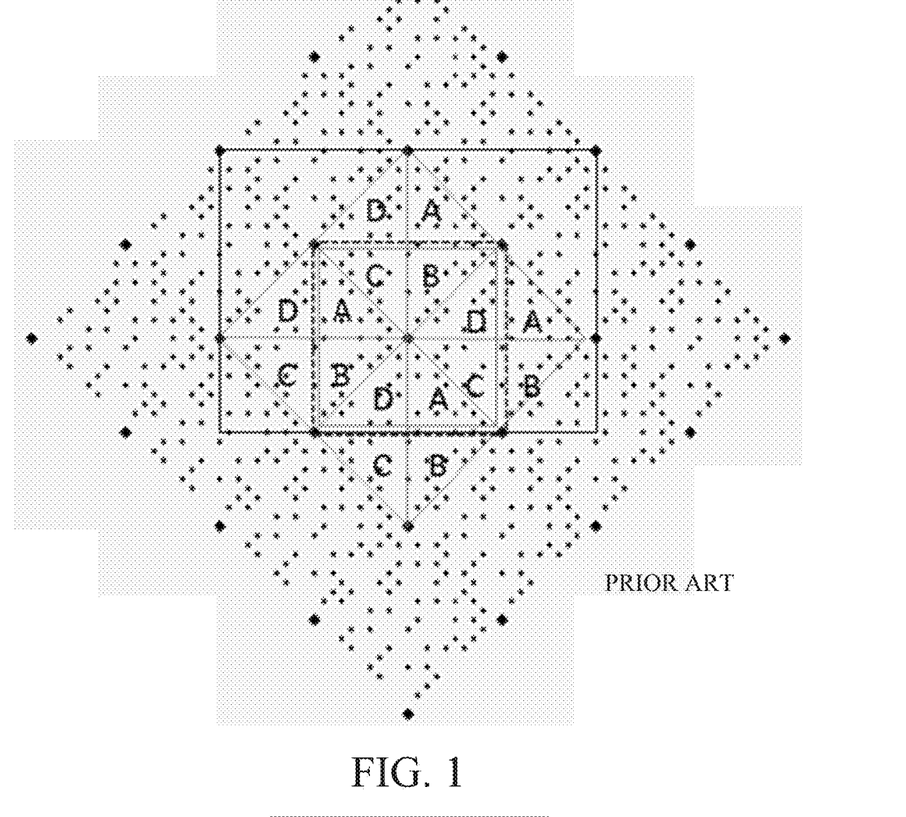
FIG. 1 shows minimum code pattern areas that need to be obtained in a worst case in the present application and the prior art (an outer larger rectangle is a minimum code pattern area that needs to be obtained in the prior art, that is, 6 times the area of a unit code pattern, and the smaller rectangle in a dashed box inside the larger rectangle is a minimum code pattern area that needs to be obtained in the present application, that is, twice the area of a unit code pattern)

In the decoding method of this invention, because a complete unit code pattern that at least includes four positioning points needs to be selected for rectangle matching, a relatively large code pattern area needs to be obtained. FIG. 1 shows minimum code pattern areas that need to be obtained in a worst case in the present invention and the prior art, where the outer larger rectangle is a minimum code pattern area that needs to be obtained in the prior art, that is, 6 times the area of a unit code pattern, and the smaller rectangle in a dashed box inside the larger rectangle is a minimum code pattern area that needs to be obtained in the present invention, that is, twice the area of a unit code pattern.

SUMMARY

In order to solve inconvenience caused by the fact that a reading device has to read a relatively large code pattern area in the prior art, the present application provides a decoding method in which a reading device only needs to read a relatively small code pattern area to implement decoding.

The technical solution of the present application is a decoding method for a matrix two-dimensional code, where a matrix two-dimensional code image to be decoded is a code array of jointed matrix two-dimensional code symbols, formed by multiple identical code pattern units; an image obtained by scanning does not need to include a complete unit code pattern, and a decoding process includes: obtaining a binary image of a to-be-decoded code array of jointed matrix two-dimensional code symbols, locating each code point and positioning point in a unit code pattern that the code point and the positioning point belong to, so as to restore a complete unit code pattern, and then performing decoding.

Preferably, the locating each code point and positioning point in a unit code pattern that the code point and the positioning point belong to refers to assigning coordinate values to each code point and positioning point, where each code point and positioning point determined by the coordinate values have a same relative position relationship as each code point and positioning point in the image obtained by scanning.

Further preferably, the assigning coordinate values to each code point and positioning point includes the following steps:

separately determining directions of a row line and a column line where each code point is located, where the directions of the row line and column line are referred as a row direction and a column direction;

separately determining a point spacing in the row direction and a point spacing in the column direction; and calibrating row coordinates of each code point and positioning point by using the point spacing in the row direction and a projection waveform in the row direction, and calibrating column coordinates of each code point and positioning point by using the point spacing in the column direction and a projection waveform in the column direction.

Alternatively, the assigning coordinate values to each code point and positioning point includes the following steps:

determining a row direction and a column direction in the image;

separately drawing a group of parallel row lines and a group of parallel column lines according to the row direction and the column direction to form a grid, and distances between the parallel row lines and between the parallel column lines are the point spacing in a column line direction and the point spacing in a row line direction in the code pattern respectively; and calculating coordinates of each cross point in the grid, so as to assign coordinate values to each code point in the image.

Further preferably, the determining a row direction and a column direction includes the following steps:

A1. recognizing the binary image, so as to determine barycenters of each code point and positioning point;

A2. projecting the barycenter of each code point in the obtained image to any straight line L, calculating the number of projections at each projection point and an average value of the numbers of projections at all projection points, and calculating a mean square error $\sigma 0$;

A3. rotating the obtained image by a predetermined angle $\theta$, and calculating a mean square error $\sigma 1$ according to the method of Step A1;

A4. rotating the obtained image by a predetermined angle $\theta$ again and calculating a mean square error $\sigma 2$ according to the method of Step A1; repeating this process until the obtained image is rotated by a total of 180°, and calculating the last mean square error $\sigma n$;

A5. drawing a line perpendicular to L at a position which is on the line L and has a maximum number of projections falling thereon in an image state corresponding to a maximum value of the mean square errors $\sigma 0$ to $\sigma n$, where the drawn line is the row direction; and A6. rotating the image state corresponding to the row direction by $\pm(90°\pm 21°)$, taking a maximum value of the mean square errors within this range, and drawing a line perpendicular to the line L at a position which is on the line L and has a maximum number of projections falling thereon in an image state corresponding to the maximum value, where the drawn line is the column direction.

Further preferably, the point spacing is determined by using a method of solving a discrete signal period by means of autocorrelation, which is specifically described as follows:

B1. translating each code point in the image state corresponding to the maximum value of the mean square error in Step A5 by m pixels along the row direction, and calculating an autocorrelation coefficient Z1 according to projection values of the barycenter of each code point before and after the translation; translating each code point in the obtained image by m+1 pixels, and calculating an autocorrelation coefficient Z2 according to projection values of the barycenter of each code point before and after the translation; translating each code point in the obtained image by m+2 pixels, and calculating an autocorrelation coefficient Z3 according to projection values of the barycenter of each code point before and after the translation; and continuing to translate the obtained image in this manner, until each code point in the obtained image is translated by m+n pixels, and calculating an autocorrelation coefficient Zn+1;

B2. taking a maximum value of Z1 to Zn+1, where a code point translation amount corresponding to the maximum value is the point spacing e in the row direction; and B3. in a same way, translating each code point in the image state corresponding to the maximum value of the mean square error in Step A6 for n' times along the column direction, and calculating a maximum autocorrelation coefficient, so as to obtain the point spacing f in the column direction;

where, e and f each are the number of pixels, m≥1, m is a natural number, m+n≈e, m+n'≈f, and m+n and m+n' each are the number of pixels corresponding to a predicted point spacing.

Further preferably, in the image rotation, a center point of the image is used as a rotation center.

The parallel row lines and parallel column lines are determined by using the following steps:

C1. separately calculating peak values of barycenter projections of code points in $a \cdot e \pm P$ areas along the row direction, and drawing the parallel column lines according to the peak value in each area; and C2. separately calculating peak values of barycenter projections of code points in $a \cdot f \pm P$ areas along the column direction, and drawing the parallel row lines according to the peak value in each area;

where, P is a natural number not greater than the smaller one of e and f, and a is a natural number.

The method for restoring a two-dimensional code is described as follows:

with a positioning point as a reference point, marking each code point according to a code structure feature of the two-dimensional code, and restoring a complete unit two-dimensional code according to the mark of each code point.

Further preferably, the method for restoring a two-dimensional code is described as follows:

with a positioning point as a reference point, marking in sequence code points at a right side or a left side of the positioning point as 0, 1, 2 . . . , 9 cyclically; marking in sequence code points at a left side or a right side of the positioning point as 9, 8, 7 . . . , 0 cyclically; marking in sequence code points at an upper side or a lower side of the positioning point as 0, 1, 2 . . . 9 cyclically; and marking in sequence code points at a lower side or an upper side of the positioning point as 9, 8, 7 . . . , 0 cyclically; and restoring a complete unit two-dimensional code according to the foregoing marks.

The present application has the following beneficial effects:

In the present application, a method of decoding after restoring least one complete unit code pattern by locating each code point in a unit code pattern that the code point belongs to only needs an area twice the area of a unit code pattern even if decoding is performed when the code pattern is rotated by a most severe degree, while a decoding method of the prior art at least needs an area six times the area of a unit code pattern. This is because that in the decoding method of the present application, a reading device does not need to read a complete unit code pattern, and decoding can be completed as long as obtained code pattern images can be combined to form a complete unit code pattern; decoding is not affected even if the obtained images are fragments belonging to different unit code patterns or the images are inclined in some degree. However, in the decoding method of the prior art, a code pattern image read by a reading device should directly include at least one complete code pattern, and therefore, a relatively large area needs to be obtained for decoding. Therefore, the decoding method of the present application significantly facilitates printing of code patterns and manufacturing of reading devices, that is, it is unnecessary to print large code patterns, and the reading devices can also be made smaller, so that the devices are easy to carry and use, and have lower costs. In addition, the present application is also applicable to a case in which a code pattern image is inclined, and has a smaller operation amount compared with the prior art, thereby saving resources.

DETAILED DESCRIPTION

For ease of comprehension, a comparison of decoding methods of the prior art and the present application is described first; by using decoding of an MPR two-dimensional code (a type of matrix two-dimensional code) as an example, the method of the present application is described in further detail below with reference to the specific embodiments and accompanying drawings.

As shown in FIG. 1, in the decoding method of the prior art, to perform rectangle matching, a complete unit code pattern (where a unit code pattern is equivalent to a code symbol in an MPR two-dimensional code) including four positioning points should be read, and then, decoding is performed. That is, in the decoding method of the prior art, four parts, indicated by A, B, C, and D, of a code pattern need to be read; moreover, the four parts need to be in a same unit code pattern, and an arrangement order of the four parts must be absolutely correct. However, in the method of the present application, only four parts, indicated by A, B, C, and D, of a code pattern need to be read for restoring a unit code pattern, and there is neither requirement on the arrangement order nor requirement on whether the four parts belong to a same unit code pattern.

Figure 2:
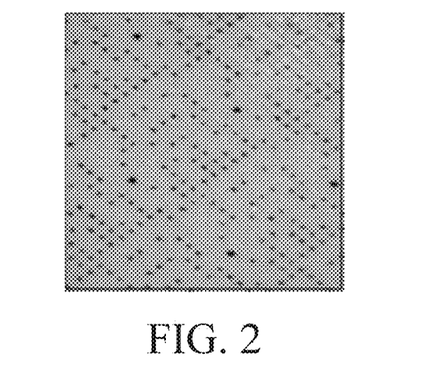
FIG. 2 is a schematic diagram of a code pattern image obtained in an embodiment (in which the code pattern image is inclined and rotated by some degree as compared with FIG. 1)

The code pattern of this embodiment includes multiple code symbols of the MPR two-dimensional code. The multiple code symbols of the MPR two-dimensional code are seamlessly jointed together, and adjacent symbols share a same positioning point (shown as a bar having marked start and end positions in the MPR code symbols, where the shape of the positioning point is a circle or a polygon), thereby forming a large-area tiled arrangement, where such an arrangement is referred to as a symbol joint. An example of an MPR code symbol joint diagram (that is, a code pattern printed in an MPR reading material) is shown in FIG. 2. In another matrix two-dimensional code, the positioning point may be replaced with a positioning line; the code also consists of multiple seamlessly-jointed unit code patterns, and can also implement the same function and be decoded by using the following method. Therefore, the positioning point in the present application also includes a module, such as a positioning line, having positioning information.

Figure 3:
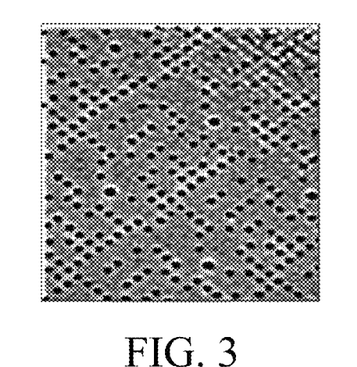
FIG. 3 is a schematic diagram of the image in FIG. 2 after being enhanced.

FIG. 3 shows a schematic diagram of a code pattern image obtained in an embodiment. Due to operation during reading, the accuracy of a reading device, and the like, the obtained code pattern image is inclined and rotated by some degree as compared with FIG. 2.

Figure 4:
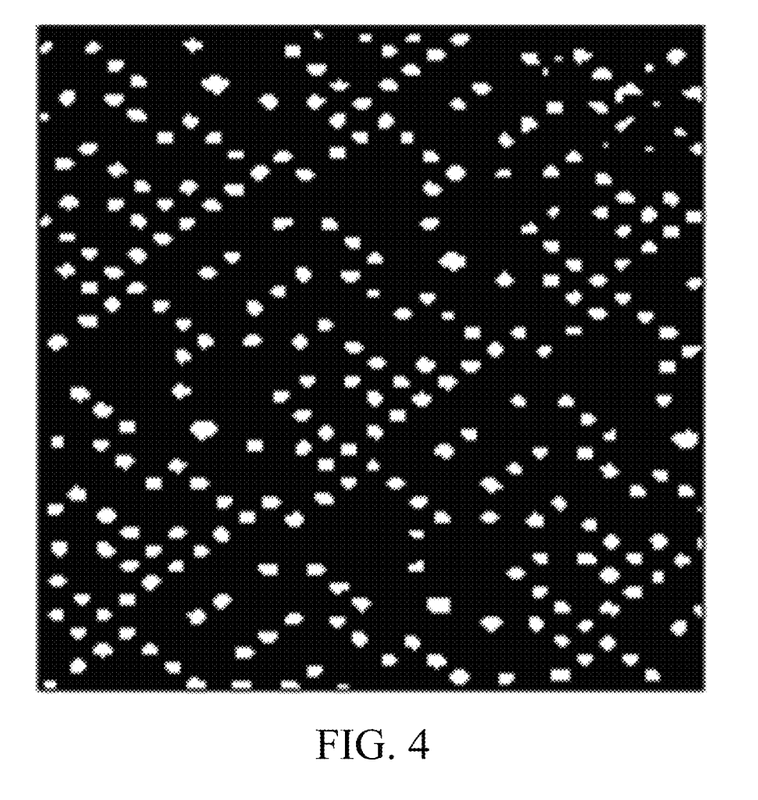
FIG. 4 is an enlarged schematic diagram of the image in FIG. 3 after being binarized.
Figure 5:
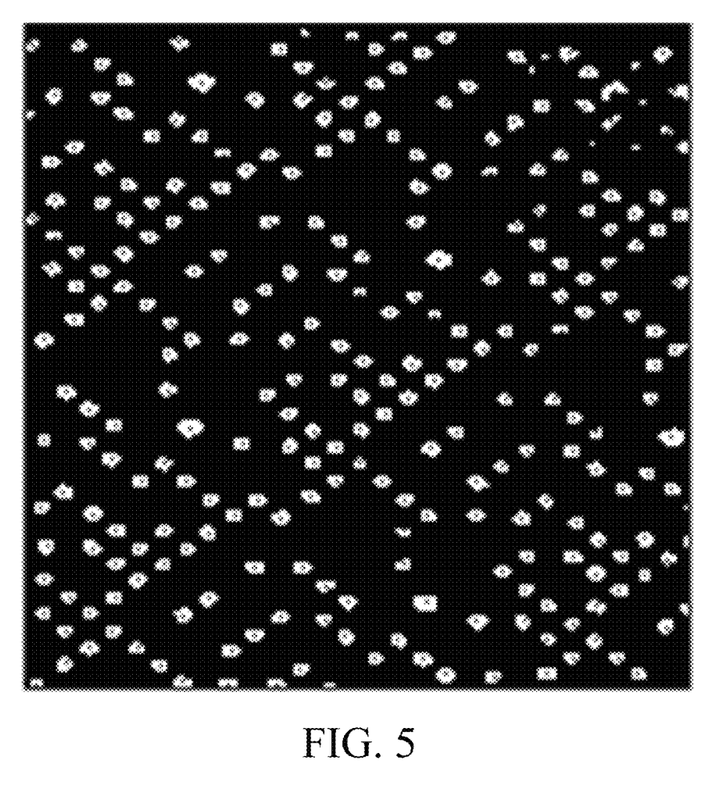
FIG. 5 is an enlarged schematic diagram of the image in FIG. 4 after being recognized.

A schematic diagram of the obtained image after being enhanced is shown in FIG. 4, and a schematic diagram of the obtained image after being binarized is shown in FIG. 5.

Figure 6:
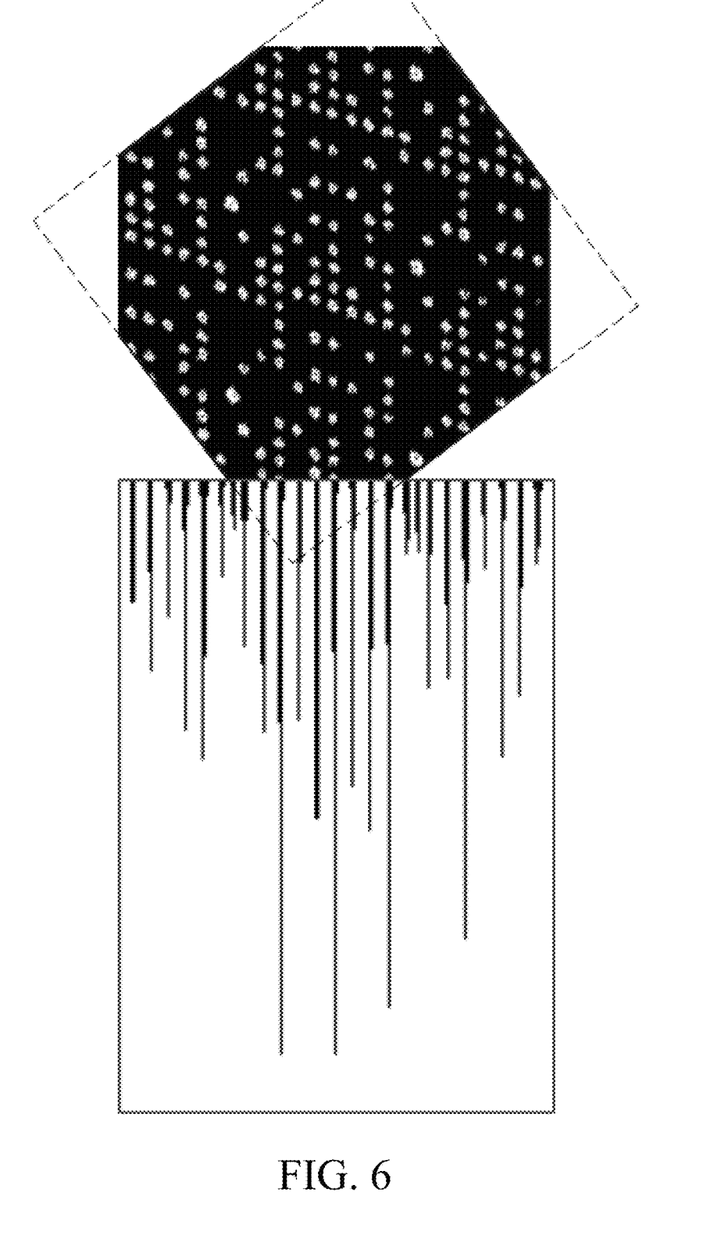
FIG. 6 is a schematic diagram of projection of the image in FIG. 4 when the image is rotated by 53° (four triangle areas at dotted line positions in the figure indicate that when the image is rotated to this angle, four corners of the image are cut off during operation)
Figure 7:
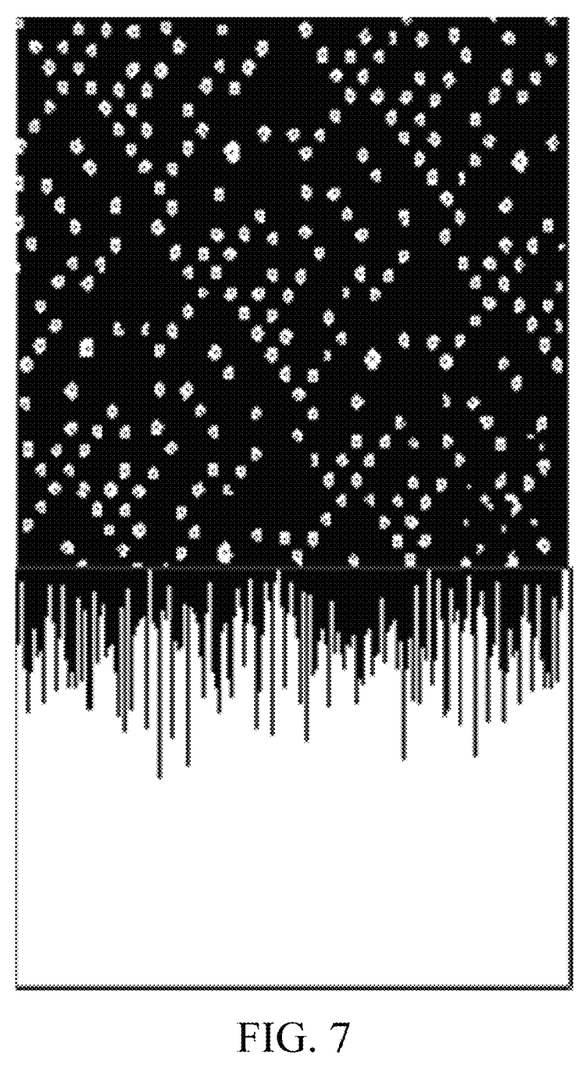
FIG. 7 is a schematic diagram of projection of the image in FIG. 4 when the image is rotated by 90°.
Figure 8:
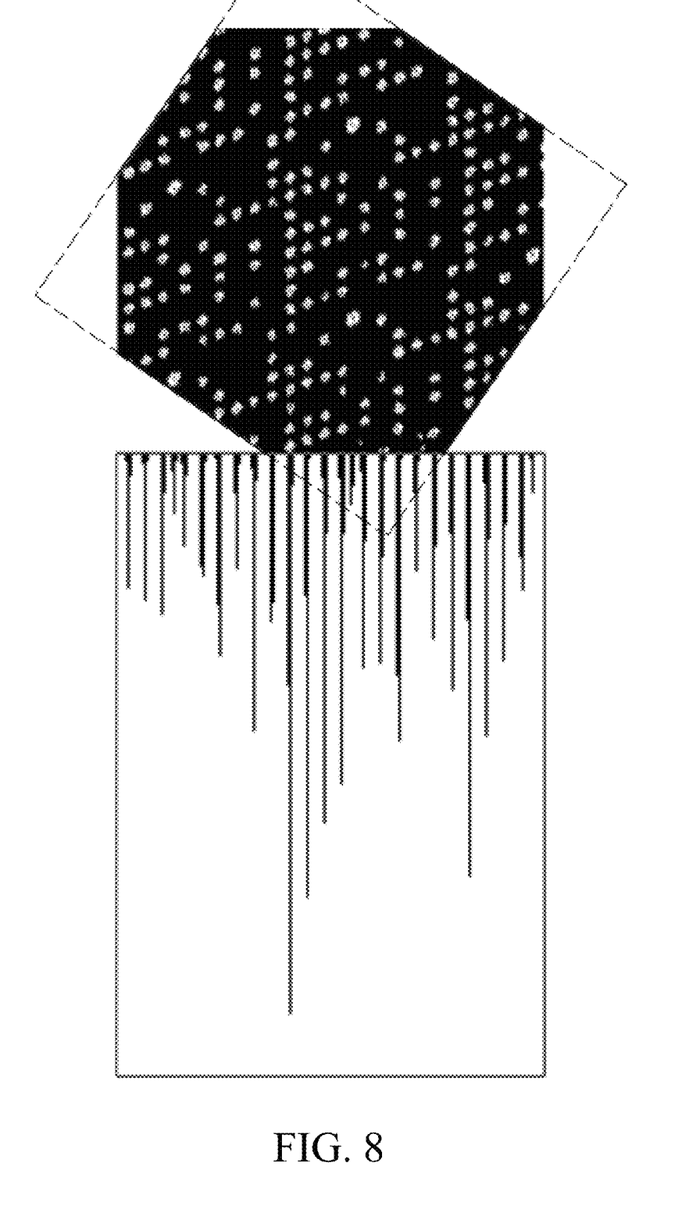
FIG. 8 is a schematic diagram of projection of the image in FIG. 4 when the image is rotated by 124° (four triangle areas at dotted line positions in the figure indicate that when the image is rotated to this angle, four corners of the image are cut off during operation)
Figure 9:
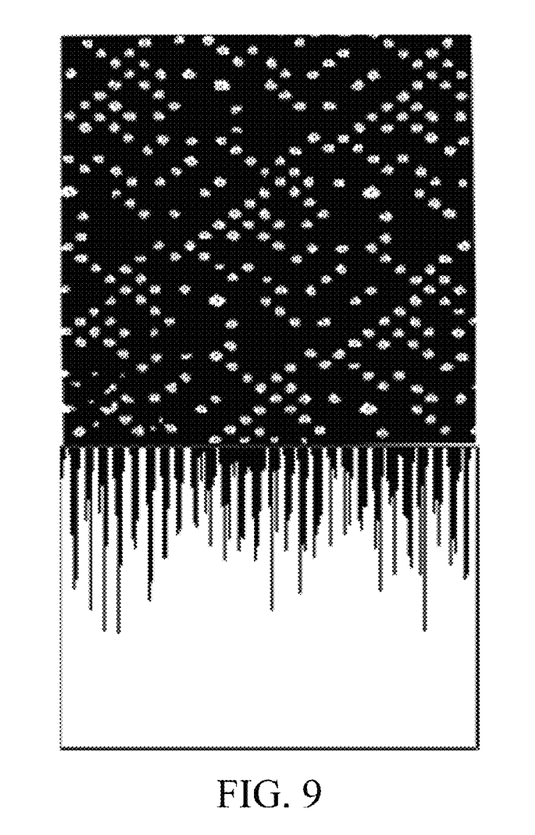
FIG. 9 is a schematic diagram of projection of the image in FIG. 4 when the image is rotated by 179°.
Figure 10:
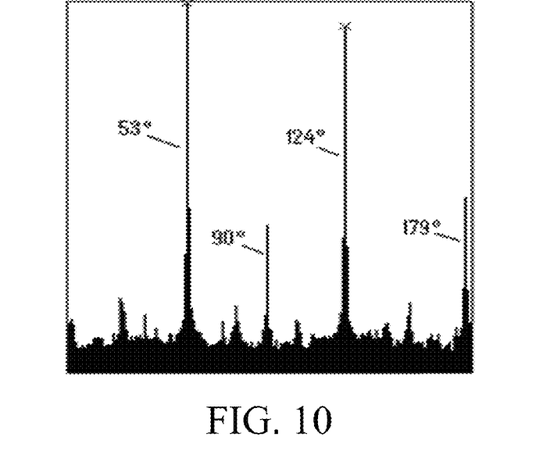
FIG. 10 is a schematic diagram of projection values of the image in FIG. 4 when the image is rotated by 0° to 180° (four peak values separately correspond to 53°, 90°, 124°, and 179°)

Then, code points (bars that represent valid data information in the MPR code symbols, where the shape of the code point is a circle or a polygon) are recognized on the basis of FIG. 5, barycenters determined and marked of each code point and positioning point are shown in FIG. 6. The barycenters of the code point and positioning point are used in subsequent processing steps.

The decoding method mainly includes the following steps: after binarizing the obtained image, locating each code point and positioning point in a unit code pattern that the code point and the positioning point belong to, so as to restore a complete unit code pattern, and then performing decoding.

In this embodiment, the locating each code point and positioning point in a unit code pattern that the code point and the positioning point belong to includes the following steps:

separately determining directions of a row line and a column line where each code point is located, where the directions of the row line and column line are referred as a row direction and a column direction; separately determining a point spacing in the row direction and a point spacing in the column direction; and calibrating row coordinates of each code point by using the row direction and the point spacing in the row direction, and calibrating column coordinates of each code point and positioning point by using the column direction and the point spacing in the column direction.

The locating each code point and positioning point in a unit code pattern that the code point and the positioning point belong to may also include the following steps:

further recognizing the binarized image, so as to determine barycenters of each code point and positioning point; determining a row direction and a column direction in the image; separately drawing a group of parallel row lines and a group of parallel column lines along the row direction and the column direction to form a grid, where distances between the parallel row lines and between the parallel column lines are the point spacing in a column line direction and the point spacing in a row line direction in the code pattern respectively, and the point spacing is a distance between barycenters of adjacent code points; and calculating coordinates of each cross point in the grid, so as to assign coordinate values to each code point and positioning point in the image, where the coordinate values indicate the locations of each code point and positioning point in the unit code pattern that the code point and the positioning point belong to.

The row direction and the column direction are preferably determined by using the following method:

projecting each code point in the image of FIG. 6 to axis X, calculating the number of projections at each projection point and an average value of the numbers of projections at all projection points, and then calculating a mean square error $\sigma 0$ of the numbers of projections at all the projection points; rotating the obtained image by a predetermined angle $\theta$, and calculating a mean square error $\sigma 1$ according to the foregoing method; rotating the obtained image by a predetermined angle $\theta$ again, and calculating a mean square error $\sigma 2$ according to the foregoing method; and repeating this process until the obtained image is rotated by a total of 180°, and calculating the last mean square error $\sigma n$; and taking an image state corresponding to a maximum value of $\sigma 0$ to $\sigma n$, and marking a direction of a line which is perpendicular to axis X and of which a projection point has a maximum number of projections in the image state as the row direction.

The center of the image is preferably used as a rotation center during image rotation, and in this case, the image rotation sweeps a minimum area and has a minimum operation amount; however, the objective of the present application can also be implemented when another point is used as the rotation center.

FIG. 6 to FIG. 9 are schematic diagrams of projection of the image when the image is rotated by 53°, 90°, 124° and 179° in this embodiment.

A principle of determining the column direction is the same as the principle of determining the row direction, except that before projection and calculation of a mean square error, an image state corresponding to the row line needs to be rotated by 90°±21°, and a maximum value of the mean square errors is taken within this range (that is, the image is rotated by 69° to 111° relative to the image state corresponding to the row line), and a direction of a line drawn perpendicular to L at a position which is on the line L and has a maximum number of projections falling thereon in the image state corresponding to the maximum value is the column direction.

Preferably, the point spacing is calculated by using the following method:

translating each code point in the image state corresponding to the maximum value of the foregoing $\sigma 0$ to $\sigma n$ by m pixels along the row direction, and calculating an autocorrelation coefficient $Z_1$ according to projection values of each code point before and after the translation; translating each code point in the obtained image by m+1 pixels, and calculating an autocorrelation coefficient $Z_2$ according to projection values of each code point before and after the translation; translating each code point in the obtained image by m+2 pixels, and calculating an autocorrelation coefficient $Z_3$ according to projection values of each code point before and after the translation; continuing to translate the obtained image in this manner, until an autocorrelation coefficient $Z_{n+1}$ is calculated; and taking a maximum value of $Z_1$ to $Z_{n+1}$, where a translation amount corresponding to the maximum value is the point spacing e in the row direction; and in a same way, translating, for n' times along the column direction, a state diagram corresponding to the maximum value of the mean square errors when the image is rotated by 69° to 111°, and calculating a maximum autocorrelation coefficient, so as to obtain the point spacing f in the column direction;

where e and f each are the number of pixels, m≥1, m is a natural number, m+n≈e, m+n'≈f, and m+n and m+n' each are the number of pixels corresponding to a predicted point spacing.

The parallel row lines and parallel column lines are determined by using the following method:

separately calculating peak values of barycenter projections of code points in a·e±P areas along the row direction, and drawing the parallel column lines according to the peak value in each area; and separately calculating peak values of barycenter projections of code points in a·f±P areas along the column direction, and drawing the parallel row lines according to the peak value in each area;

where, P is a natural number not greater than the smaller one of e, f, and a is a natural number.

Figure 11:
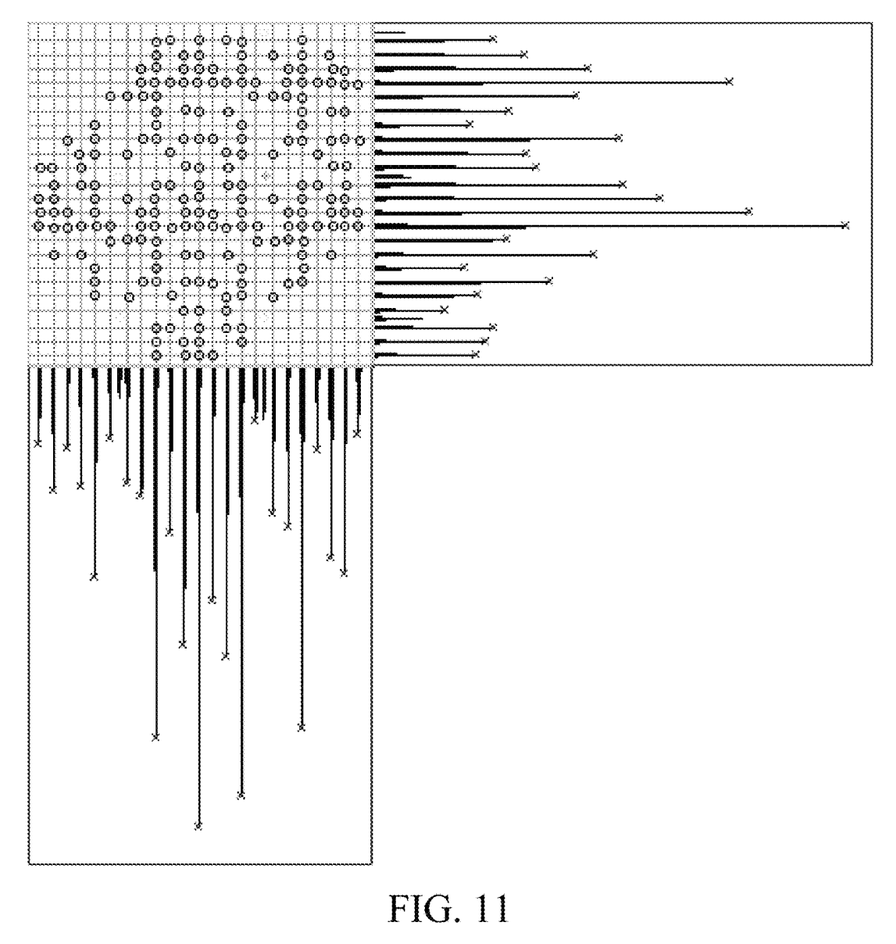
FIG. 11 is a schematic diagram of a grid constructed in the embodiment of FIG. 2.

The foregoing parallel row lines and parallel column lines construct a grid together, as shown in FIG. 11. A grid constructing method is to separately extend the parallel row lines and parallel column lines to so that the parallel row lines and parallel column lines cross each other, thereby forming the grid.

A method for assigning values to each code point and positioning point in the image is as follows:

with a center point of the image as a reference point, calculating coordinate values of each cross point in the grid, where coordinate values of each code point in the obtained image are coordinate values of a cross point that is in the grid and closest to the code point. The coordinate values of the positioning point are determined according to coordinate values of four code points adjacent to the positioning point. The reference point may not be the center point of the image, any point on the image can be selected as the reference point, and even a point outside the image can be used as the reference point.

The method for restoring a two-dimensional code is described in as follows (if the code is another matrix two-dimensional code, the code merely needs to be restored according to an encoding rule of the matrix two-dimensional code):

A module size of the positioning point should be twice a module size of the code point. During barycenter recognition of each code point and locating of each code point in a unit code pattern that the code point belongs to, barycenter recognition and locating are also performed on the positioning point, and area information of the positioning point is marked (for example, the area information of the positioning point is recorded), so that the positioning point can be extracted as a reference point in subsequent two-dimensional code restoring. A specific locating method is that: coordinates of a projection of a barycenter neither fall on the row line nor fall on the column line, and a module size in a code pattern image corresponding to the barycenter is twice or more than twice a module size on the row line and the column line.

Figure 12:
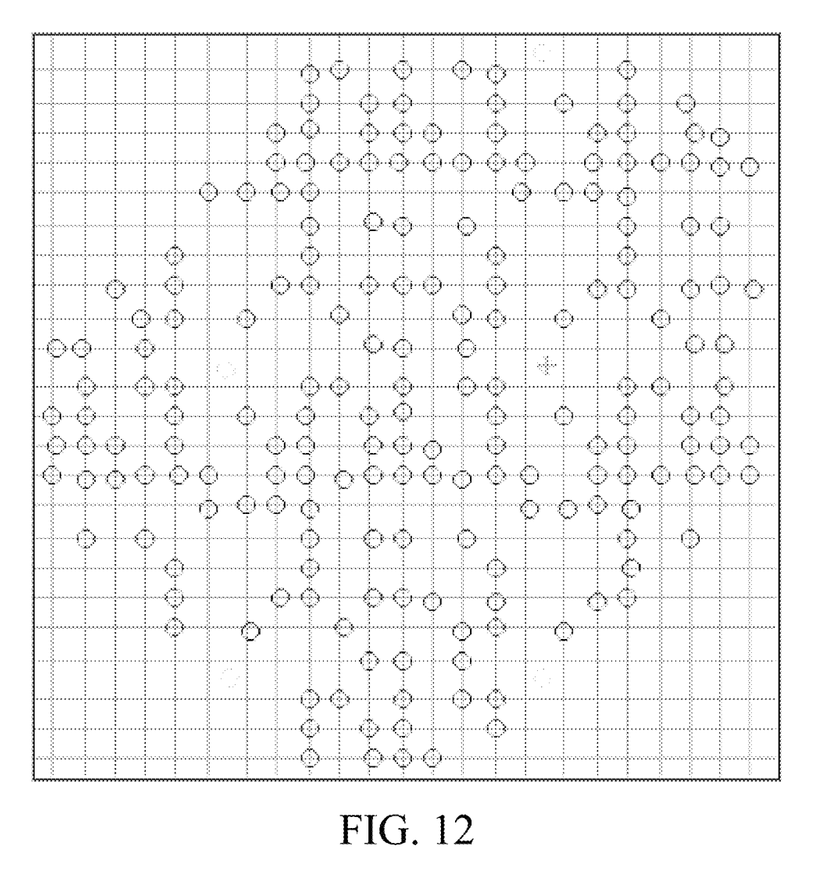
FIG. 12 is a schematic diagram of a restored unit code pattern.

With the positioning point as a reference point, code points at a right side of the positioning point are marked in sequence as 0, 1, 2 . . . , 9 cyclically; code points at a left side of the positioning point are marked in sequence as 9, 8, 7 . . . , 0 cyclically; code points at an upper side of the positioning point are marked in sequence as 0, 1, 2 . . . , 9 cyclically; code points at a lower side of the positioning point are marked in sequence as 9, 8, 7 . . . , 0 cyclically; and a complete unit two-dimensional code is restored according to the foregoing marks, as shown in FIG. 12, where "+" in the figure represents the positioning point and each circle represents a code point.

In this embodiment, the positioning point has the following features:

1) coordinates of the barycenter are located between the row and column;

2) the area of the positioning point is greater than twice an average area of the code points; and 3) no code point exists at cross positions of an upper row line, a lower row line, a left column line and a right column line neighboring the positioning point.

When row and column coordinate values of the code point are determined or coordinate values are assigned to the code point, the positioning point is also marked for reference use in subsequent steps.

The foregoing content is further detailed description of the present application with reference to specific embodiments, and it should not be considered that specific implementation of the present application is limited to the description. Any derivation or replacement made within the concept of the present application by a person of ordinary skill in the technical field of the present application should be regarded as the protection scope of the present application.

What is claimed is:

1. A decoding method for a matrix two-dimensional code, wherein a matrix two-dimensional code image to be decoded is a code array of jointed matrix two-dimensional code symbols, formed by multiple identical unit code patterns; and an image obtained by scanning does not need to comprise a complete unit code pattern, the decoding method comprising:
   obtaining a binary image of a to-be-decoded code array of jointed matrix two-dimensional code symbols, locating each code point and positioning point in a unit code pattern that the code point and the positioning point belong to, so as to restore a complete unit code pattern, and then performing decoding,
   wherein the locating each code point and positioning point in a unit code pattern that the code point and the positioning point belong to refers to assigning coordinate values to each code point and positioning point, wherein each code point and positioning point determined by the coordinate values have a same relative location relationship as each code point and positioning point in the image obtained by scanning;
   wherein the assigning coordinate values to each code point and positioning point comprises the following steps:
      separately determining directions of a row line and a column line where each code point is located, wherein the determined directions are referred as a row direction and a column direction;
      separately determining a point spacing in the row direction and a point spacing in the column direction; and
      calibrating row coordinates of each code point and positioning point by using the point spacing in the row direction and a projection waveform in the row direction, and calibrating column coordinates of each code point and positioning point by using the point spacing in the column direction and a projection waveform in the column direction.

2. The decoding method for a matrix two-dimensional code according to claim 1, wherein the determining a row direction and a column direction comprises the following steps:
   A1. recognizing the binary image, so as to determine barycenters of each code point and positioning point;
   A2. projecting the barycenter of each code point in the obtained image to any straight line L, calculating the number of projections at each projection point and an average value of the numbers of projections at all projection points, and calculating a mean square error σ0;
   A3. rotating the obtained image by a predetermined angle θ, and calculating a mean square error σ2 according to the method of Step A1;
   A4. rotating the obtained image by a predetermined angle θ again, and calculating a mean square error σ2 according to the method of Step A1; repeating the process until the image is rotated by a total of 180°, and calculating the last mean square error σn;
   A5. drawing a line perpendicular to L at a position which is on the line L and has a maximum number of projections falling thereon in an image state corresponding to a maximum value of the mean square errors σ0 to σn, wherein the drawn line is the row direction; and
   A6. rotating the image state corresponding to the row direction by ±(90°±21°), taking a maximum value of the mean square errors within this range, and drawing a line perpendicular to L at a position which is on the line L and has a maximum number of projection points falling thereon in an image state corresponding to the maximum value, wherein the drawn line is the column direction.

3. The decoding method for a matrix two-dimensional code according to claim 2, wherein the point spacing is determined by using a method of solving a discrete signal period by means of autocorrelation, which is specifically described as follows:
   B1. translating each code point in the image state corresponding to the maximum value of the mean square error in Step A5 by m pixels along the row direction, and calculating an autocorrelation coefficient Z1 according to projection values of the barycenter of each code point before and after the translation; translating each code point in the obtained image by m+1 pixels, and calculating an autocorrelation coefficient Z2 according to projection values of the barycenters of each code point before and after the translation; translating each code point in the obtained image by m+2 pixels, and calculating an autocorrelation coefficient Z3 according to projection values of the barycenter of each code point before and after the translation; and continuing to translate the obtained image in this manner, until each code point in the obtained image is translated by m+n pixels, and calculating an autocorrelation coefficient Zn+1;
   B2. taking a maximum value of Z1 to Zn+1, wherein a code point translation amount corresponding to the maximum value is the point spacing e in the row direction; and
   B3. in a same way, translating each code point in the image state corresponding to the maximum value of the mean square errors in Step A6 for n' times along the column direction, and calculating a maximum autocorrelation coefficient, so as to obtain the point spacing f in the column direction;

wherein e and f are each the number of pixels, m≥1, m is a natural number, m+n≈e, m+n'≈f, and m+n and m+n' are each the number of pixels corresponding to a predicted point spacing.

4. The decoding method for a matrix two-dimensional code according to claim 2, wherein in the image rotation, a center point of the image is used as a rotation center.

5. The decoding method for a matrix two-dimensional code according to claim 1, wherein a method for restoring a complete unit code pattern is described as follows:
   with a positioning point as a reference point, marking each code point according to a code structure feature of the two-dimensional code, and restoring a complete unit two-dimensional code according to the mark of each code point.

6. The decoding method for a matrix two-dimensional code according to claim 5, wherein the method for restoring a complete unit code pattern is described as follows:
   with a positioning point as a reference point, marking in sequence code points at a right side or a left side of the positioning point as 0, 1, 2 . . . , 9 cyclically; marking in sequence code points at a left side or a right side of the positioning point as 9, 8, 7 . . . , 0 cyclically; marking in sequence code points at an upper side or a lower side of the positioning point as 0, 1, 2 . . . , 9 cyclically; and marking in sequence code points at a lower side or an upper side of the positioning point as 9, 8, 7 . . . , 0 cyclically; and
   restoring a complete unit two-dimensional code according to the foregoing marks.

7. A decoding method for a matrix two-dimensional code, wherein a matrix two-dimensional code image to be decoded is a code array of jointed matrix two-dimensional code symbols, formed by multiple identical unit code patterns; and an image obtained by scanning does not need to comprise a complete unit code pattern, the decoding method comprising:
   obtaining a binary image of a to-be-decoded code array of jointed matrix two-dimensional code symbols, locating each code point and positioning point in a unit code pattern that the code point and the positioning point belong to, so as to restore a complete unit code pattern, and then performing decoding,
   wherein the locating each code point and positioning point in a unit code pattern that the code point and the positioning point belong to refers to assigning coordinate values to each code point and positioning point, wherein each code point and positioning point determined by the coordinate values have a same relative location relationship as each code point and positioning point in the image obtained by scanning;
   wherein the assigning coordinate values to each code point and positioning point comprises the following steps:
      determining a row direction and a column direction in the image;
      separately drawing a group of parallel row lines and a group of parallel column lines according to the row direction and the column direction to form a grid, wherein distances between the parallel row lines and between the parallel column lines are the point spacing in a column line direction and the point spacing in a row line direction in the code pattern respectively; and
      calculating coordinates of each cross point in the grid, so as to assign coordinate values to each code point and positioning point in the image.

8. The decoding method for a matrix two-dimensional code according to claim 7, wherein the parallel row lines and parallel column lines are determined by the following steps:
   C1. separately calculating peak values of barycenter projections of code points in a·e±P areas along the row direction, and drawing the parallel column lines according to the peak value in each area; and
   C2. separately calculating peak values of barycenter projections of code points in a·f±P areas along the column direction, and drawing the parallel row lines according to the peak value in each area;
   wherein, P is a natural number not greater than the smaller one of e, f, and a is a natural number.

9. The decoding method for a matrix two-dimensional code according to claim 7, wherein the determining a row direction and a column direction comprises the following steps:
   A1. recognizing the binary image, so as to determine barycenters of each code point and positioning point;
   A2. projecting the barycenter of each code point in the obtained image to any straight line L, calculating the number of projections at each projection point and an average value of the numbers of projections at all projection points, and calculating a mean square error $\sigma 0$;
   A3. rotating the obtained image by a predetermined angle $\theta$, and calculating a mean square error $\sigma 1$ according to the method of Step A1;
   A4. rotating the obtained image by a predetermined angle $\theta$ again, and calculating a mean square error $\sigma 2$ according to the method of Step A1; repeating the process until the image is rotated by a total of 180°, and calculating the last mean square error $\sigma n$;
   A5. drawing a line perpendicular to L at a position which is on the line L and has a maximum number of projections falling thereon in an image state corresponding to a maximum value of the mean square errors $\sigma 0$ to $\sigma n$, wherein the drawn line is the row direction; and
   A6. rotating the image state corresponding to the row direction by ±(90°±21°), taking a maximum value of the mean square errors within this range, and drawing a line perpendicular to L at a position which is on the line L and has a maximum number of projection points falling thereon in an image state corresponding to the maximum value, wherein the drawn line is the column direction.

10. The decoding method for a matrix two-dimensional code according to claim 9, wherein the point spacing is determined by using a method of solving a discrete signal period by means of autocorrelation, which is specifically described as follows:
   B1. translating each code point in the image state corresponding to the maximum value of the mean square error in Step A5 by m pixels along the row direction, and calculating an autocorrelation coefficient Z1 according to projection values of the barycenter of each code point before and after the translation; translating each code point in the obtained image by m+1 pixels, and calculating an autocorrelation coefficient Z2 according to projection values of the barycenters of each code point before and after the translation; translating each code point in the obtained image by m+2 pixels, and calculating an autocorrelation coefficient Z3 according to projection values of the barycenter of each code point before and after the translation; and continuing to translate the obtained image in this manner, until each code point in the obtained image is translated by m+n pixels, and calculating an autocorrelation coefficient $Z_{n+1}$;

B2. taking a maximum value of $Z_1$ to $Z_{n+1}$, wherein a code point translation amount corresponding to the maximum value is the point spacing e in the row direction; and B3. in a same way, translating each code point in the image state corresponding to the maximum value of the mean square errors in Step A6 for n' times along the column direction, and calculating a maximum autocorrelation coefficient, so as to obtain the point spacing f in the column direction;

wherein e and f are each the number of pixels, m≥1, m is a natural number, m+n≈e, m+n'≈f, and m+n and m+n' are each the number of pixels corresponding to a predicted point spacing.

11. The decoding method for a matrix two-dimensional code according to claim 9, wherein in the image rotation, a center point of the image is used as a rotation center.

* * * * *